US005708554A

United States Patent [19]

Liner

[11] Patent Number: 5,708,554

[45] Date of Patent: Jan. 13, 1998

[54] POWER OUTLET BOX WITH SPECIAL PROTECTION LOGIC

[76] Inventor: Leonard Liner, 1548 Fruitland Ave., Mayfield Heights, Ohio 44124

[21] Appl. No.: 614,190

[22] Filed: Mar. 12, 1996

[51] Int. Cl.[6] .................................................. H02H 5/04

[52] U.S. Cl. ........................... 361/104; 340/639; 439/652

[58] Field of Search ............................ 361/93, 103, 104, 361/111, 626; 340/635, 638, 639, 641, 657, 664; 439/621, 650–652, 501

[56] References Cited

U.S. PATENT DOCUMENTS

| | | | |
|---|---|---|---|
| D. 306,012 | 2/1990 | Oesterheld . | |
| D. 354,751 | 1/1995 | Lee . | |
| 3,622,840 | 11/1971 | Kahn | 361/626 |
| 4,659,161 | 4/1987 | Holcomb | 339/113 L |
| 4,867,701 | 9/1989 | Wiand | 439/501 |
| 5,071,367 | 12/1991 | Luu | 439/501 |
| 5,243,648 | 9/1993 | Gilardi | 380/6 |
| 5,292,257 | 3/1994 | Milan | 439/214 |
| 5,413,501 | 5/1995 | Munn | 439/535 |

*Primary Examiner*—Fritz Fleming
*Assistant Examiner*—Michael Sherry

[57] ABSTRACT

A power outlet box with special protection logic including a circuit having an on-off switch connected to the power input lead and a first fuse of relatively high rating protecting a first electrical outlet. A number of serially arranged outlets are connected to the power input lead through a selector switch which connects to one of a plurality of fusible links having lower ratings than the first fuse. The capacity of the outlets is controlled by the rating of the fuse selected.

8 Claims, 2 Drawing Sheets

POWER OUTLET BOX WITH SPECIAL PROTECTION LOGIC

BACKGROUND OF THE INVENTION

1. Field of the Invention

This invention relates generally to a multiple outlet electrical outlet strip, and more specifically to such a strip that includes multiple fused protection logic.

2. The Problem and Relevant Prior Art

Electrical strip out-lets have become popular as of late due at least in part to the increase in the use of personal computers. Much of this equipment is designed with a separate line input cord which is fashioned to plug into the common 110 volt wall outlet. When building a system from the various components, often each of those components will have different amperage requirements. In order to promote safety and prevent fire and other damage caused as a result of an over-fused circuit it is well founded that each unit should have a fuse that coincides with the amperage draw for the component. Since, it is impractical to externally fuse each component, appliance or light an acceptable alternative is to provide an electrical outlet strip that includes multiple outlets with predetermined fused capacity.

A review of the prior art finds an abundance of multiple outlet electrical strips. The most relevant art was found in U.S. patents as for example: U.S. Pat. No. 4,659,161 issued Apr. 21, 1987 to Holcomb for an adapter plug for personal computers including voltage spike protectors and lights to indicate the operability of the voltage spike protectors; U.S. Pat. No. 4,867,701 issued Sep. 19, 1989 to Wiand for an electrical outlet strip with a control switch for the strip and a built in circuit breaker. One outlet is termed oversize in that it is spaced from the other outlets to allow an over size plug, such as are part of a voltage reducing transformer, to be installed without interfering with other outlets; U.S. Design Patent No. Des. 306,012 issued Feb. 13, 1990 to Oesterheld et al. for the ornamental design of an electrical design; U.S. Pat. No. 5,071,367 issued Dec. 10, 1991 to Luu for a power strip with an adjustable cord and includes a power strip with a wire sized groove that encircles the strip and collects and stores excess wire; U.S. Pat. No. 5,292,257 issued Mar. 8, 1994 to Milan for a modular outlet strip which allows the user to add outlets by simply plugging each specially designed unit into another along a longitudinal axis beginning with a modular surge protector connectable to a voltage supply, and U.S. Design Patent No. Des. 354,731 issued Jan. 24, 1995 to Lee for the ornamental design of a multiple electrical socket unit.

The cited prior art taken either alone or in combination with other cited prior art or taken with the general state of the art fails to show, suggest, anticipate or teach the invention claimed herein.

The instant invention as disclosed and claimed herein provides distinct and useful advantages not previously known to the prior art.

SUMMARY OF THE INVENTION

The invention is characterized by a multiple outlet power box with selectively protected outlet logic. A master outlet is fused to the full rating of the circuit and may be used for the primary device or instrument in the aggregation of devices connected to the power box. The secondary outlets are selectively fused to a less than full rating. A plurality of fuses connected in parallel to the positive lead allows a selector switch to connect the secondary outlets to be fused at either 12, 10 or 8 amperes for example. Another position on the selector switch will by pass the fuses and connect the secondary outlets directly to the main fuse of a value of 15 amperes for example.

The power box includes a main on/off switch that controls the line power to the circuit and all outlets. A first indicator light indicates when the power is on for the main outlet. A second indicator light indicates when the power is also on for the secondary outlets, that is, all fuses are conducting.

In use, the main unit, a computer or medical measuring device for example, that needs isolation from an ancillary unit or units on the power box is connected to the main fuse. The secondary unit or units such as a printer or desk lamp for example, is connected to the secondary outlets at a lower fuse rating. The effect is to prevent the interruption of power to the main unit because of a short circuit or other problem with one or more of the ancillary units. The secondary fuse will blow before the higher rated main fuse or circuit breaker thereby providing uninterrupted power to the main unit.

It is therefore an object of the invention to provide a new and improved power outlet box with special protection logic.

It is another object of the invention to provide a new and improved power outlet box that protects a main unit outlet from secondary unit defects.

It is a further object of the invention to provide a new and improved power outlet box that provides selective fuse protection for secondary outlets.

It is still another object of the invention to provide a new and improved power outlet box which has all the advantages of prior art like devices and none of the disadvantages.

It is still a further object of the invention to provide a new and improved power outlet box which may be easily and efficiently manufactured and marketed.

It is another object of the invention to provide a new and improved power outlet box which is of a durable and reliable construction.

It is another object of the invention to provide a new and improved power outlet box which is susceptible to a low cost of manufacture with regard to both materials and labor, and which accordingly is then susceptible to low prices of sale to the consuming public, thereby making such power outlet box economically available to the buying public.

These, together with other objects of the invention, along with the various features of novelty which characterize the invention, are pointed out with particularity in the claims annexed to and forming a part of this disclosure. For a better understanding of the invention, its operating advantages and the specific objects attained by uses, reference should be had to the accompanying drawings and descriptive matter in which there is illustrated preferred embodiments of the invention.

BRIEF DESCRIPTION OF THE DRAWINGS

The invention will be better understood and objects other than those set forth and will become apparent when consideration is given to the following detailed description thereof. Such description makes reference to the annexed drawings wherein.

DETAILED DESCRIPTION OF A PREFERRED EMBODIMENT

Figure 1:
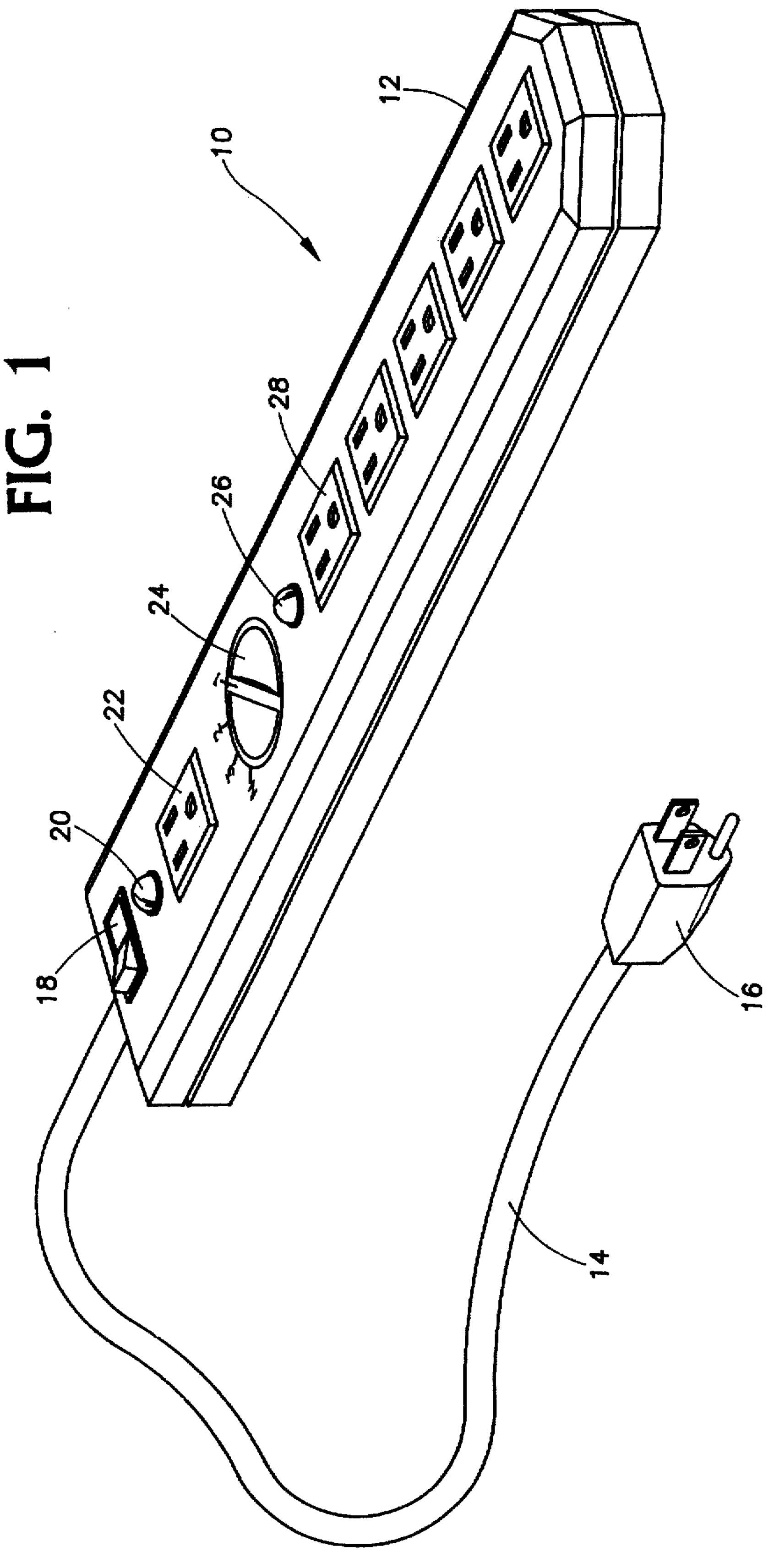
FIG. 1 is a perspective view of the invention.

Referring now to FIG. 1 the invention is shown generally at 10 and includes an enclosing box 12. From the box extends a connecting lead 14 which is of a conventional three conductor type with a standard three prong plug 16. The working surface of the box contains a main power on-off switch 18 and an indicator lamp 20 indicating that power is on and available to the master outlet 22 and subsequent outlets 28. A selector switch 24 determines the fuse rating for outlets 28. Indicator lamp 26 functions for each complete circuit of the outlets 28. If any of the fuses of the circuit are non conductive the indicator lamp 26 will not light when the selector switch is turned to that position.

Figure 2:
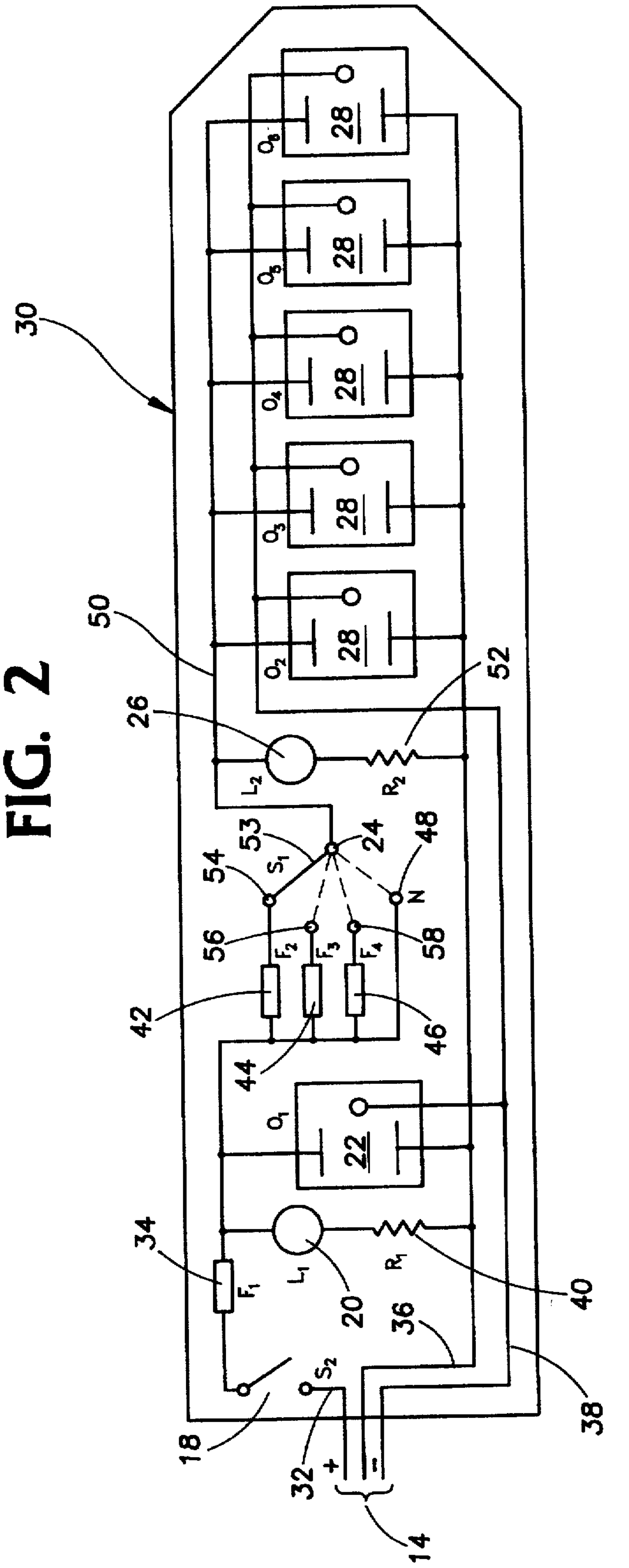
FIG. 2 is a schematic representation of the circuit of the invention.

Concerning FIG. 2, the protective logic circuit is shown generally at 30. Conventional alternating current input power of 120 volts and 60 hertz is introduced to the circuit via line 14. Within the power box 10 the line divides into the three components. Positive line 32 passes through on-off switch 18 and connects to one end of the fuseholder type circuit breaker 34 which is rated at 120 volts and 15 amperes. Negative line 36 connects directly to the master outlet 22 and the secondary outlets 28. Similarly, ground lead 38 connects directly to the master outlet 22 and the secondary outlets 28. Indicator lamp 20 is connected through resister 40 to the positive line 32 and negative line 36 post fuse 34. If fuse 34 lacks continuity the lamp 20 will not light although power is available at switch 18. Line 32 connects to one side of parallel fuses or circuit beakers 42,44 and 46. The protective devices are rated at 12, 10 and 8 amperes respectively. Line 32 terminates at terminal 48 of selector switch 24. Positive line 50 connects the selector switch 24 with the positive side of the secondary connectors 28. Lamp 26 connects to lines 36 and 50 through resister 52. As the arm 53 of switch 24 moves from terminal to terminal 48, 54,56 and 58 lamp 26 will light for each powered circuit. In the event a circuit is disabled because of either fuse, protective device 34 or fuses 42,44,46 the lamp will not light, informing the user that the secondary outlets at a particular fuse rating are not functioning.

In order for the logic to work in the most effective manner the steps as shown in the following table must be observed.

| Loading power of equipment connected to master outlet (22) | Position of selector switch (24) | Protection logic for master outlet (22) |
|---|---|---|
| 240w(2A) or less | fuse 42 (12A) | 2A + 12A < 15A fuse 34 |
| 240W(2A)TO 480W(4A) | fuse 44 (10A) | 4A + 10A < 15A fuse 34 |
| 480W(4A)TO 720W(6A) | fuse 46 (8A) | 6A + 8A < 15A fuse 34 |
| Regular outlet box | terminal 48 (0A) | — |

It should be understood, of course, that the foregoing disclosure relates to only a preferred embodiment of the invention and that numerous modifications or alterations may be made therein without departing from the spirit and scope of the invention as set forth in the appended claims.

I claim:

1. A power outlet box with special protection logic comprising:

a power input lead having positive, negative, and ground leads;

a main on/off switch (S2) having first and second terminals;

said first terminal of said main on/off switch (S2) connected to said positive lead of said power input lead;

a main fuse (F1) having first and second terminals;

said first terminal of said main fuse (F1) connected to said second terminal of said main on/off switch (S2);

a master electrical outlet (O1) connected to said second terminal of said main fuse (F1) and said negative and ground leads of said power input lead;

a selector switch (S1) having input and output terminals;

a plurality of fuse links (F2,F3,F4) connected selectively between said input terminal of said selector switch (S1) and said second terminal of said main fuse;

a first indicator lamp (L1) and a first resistor (R1) connected serially between said second terminal of said main fuse and said negative lead of said power input lead;

a second indicator lamp (L2) and a second resistor (R2) connected serially between said output terminal of said selector switch and said negative lead of said power input lead;

a plurality of electrical outlets (O2,O3,O4,O5,O6) connected in parallel between said output terminal of said selector switch (S1) and said negative lead of said power input lead.

2. A power outlet box according to claim 1 wherein said main fuse (F1) is rated at fifteen amperes.

3. A power outlet box according to claim 2 wherein each fuse link of said plurality of fuse links (F2,F3,F4) is rated less than fifteen amperes.

4. A power outlet box according to claim 3 including a direct link from said main fuse (F1) to said selector switch.

5. A power outlet box according to claim 4 wherein said second indicator lamp (L2) shows an open or closed condition of a selected fusible link of said plurality of fusible links.

6. A power outlet box according to claim 5 including a ground wire connecting each electrical outlet (O1,O2,O3,O4,O5,O6) with said ground lead of said power input lead.

7. A power outlet box according to claim 6 wherein said plurality of electrical outlets comprises at least five variably fused electrical outlets.

8. A power outlet box according to claim 7 including a cover and enclosure having accommodation for said plurality of electrical outlets, said switches, said fuses, and said indicator lamps.

* * * * *